United States Patent [19]
Syers

[11] Patent Number: 5,147,110
[45] Date of Patent: Sep. 15, 1992

[54] REMOVABLE HEADREST ASSEMBLY FOR MOTOR VEHICLE SEATS

[76] Inventor: Charles S. Syers, 325 Ascot Rd., Hillsborough, Calif. 94010

[21] Appl. No.: 617,832

[22] Filed: Nov. 26, 1990

[51] Int. Cl.⁵ ............................................. A61G 15/00
[52] U.S. Cl. ..................................... 297/397; 297/220
[58] Field of Search ............... 297/397, 218, 219, 220, 297/221, 226, 284, 283

[56] References Cited

U.S. PATENT DOCUMENTS

| | | | |
|---|---|---|---|
| 2,867,266 | 1/1959 | Vogler | 297/397 X |
| 3,043,626 | 7/1962 | Requa | 297/397 |
| 3,046,057 | 7/1962 | Smetko | 297/397 |
| 3,062,586 | 11/1962 | Rowland | 297/397 |
| 3,195,953 | 7/1965 | Zacks | 297/397 |
| 3,292,973 | 12/1966 | Cogut | 297/397 |
| 4,206,945 | 6/1980 | Kifferstein | 297/397 X |
| 4,253,701 | 3/1981 | Kifferstein | 297/220 |
| 4,862,536 | 9/1989 | Pruit | 297/397 X |

FOREIGN PATENT DOCUMENTS 152969 8/1953 Australia ............................. 297/397
90890 12/1957 Norway ............................... 297/397

Primary Examiner—Laurie K. Cranmer
Attorney, Agent, or Firm—Townsend & Townsend

[57] ABSTRACT

The invention is a removable, lightweight and durable headrest assembly which can be affixed to a wide range of vehicle seats. The removable headrest assembly includes a sheet of fabric material connected at its upper end to a flexible housing for receiving a cushion and forming a headrest. When the headrest assembly is installed, the flexible tail of the sheet extends along the surface of a seatback and is inserted through the gap formed between a seatback and seat bottom portion and has means to secure it around a blocking roll which is used to anchor the headrest into position. Different sized blocking rolls can be used for front seats and back seats in vehicles as necessary. Alternative embodiments of the invention include lumbar pads and/or cushioned seatback capes to enhance comfort and safety.

12 Claims, 2 Drawing Sheets

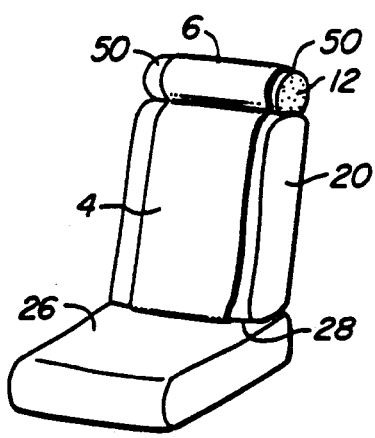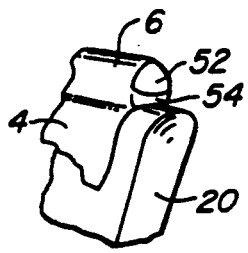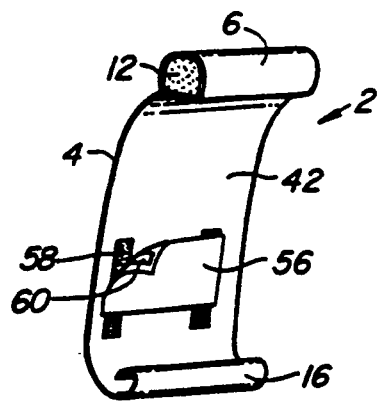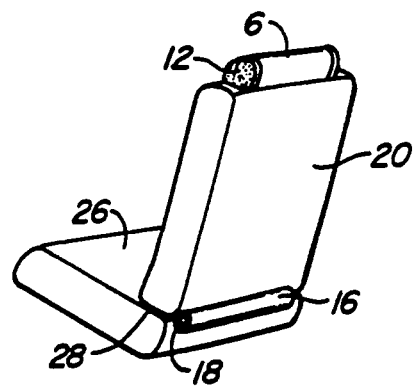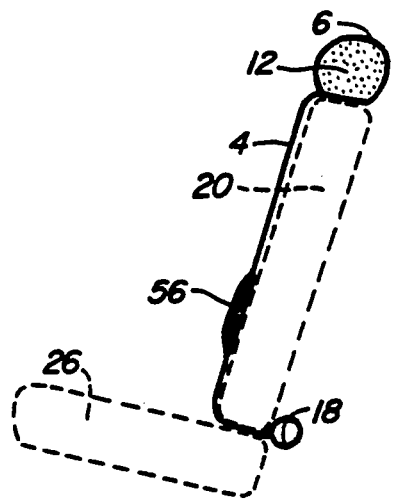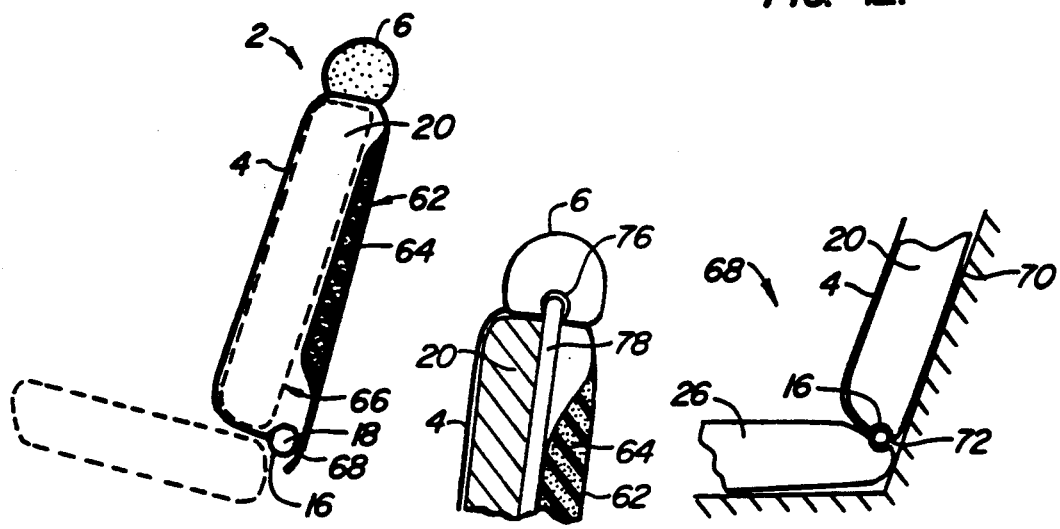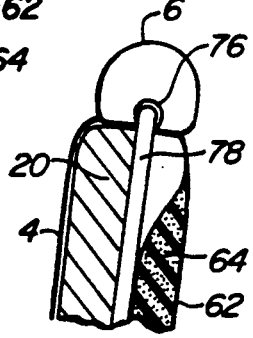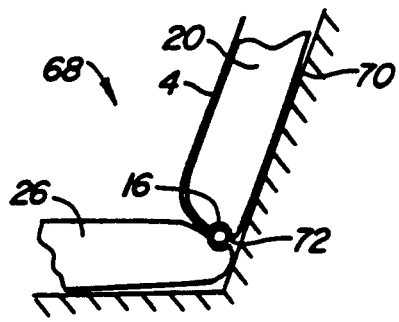

REMOVABLE HEADREST ASSEMBLY FOR MOTOR VEHICLE SEATS

BACKGROUND OF THE INVENTION

The invention relates generally to a headrest for seats. More specifically, the invention relates to a removable headrest which can be affixed to motor vehicle seats which lack any type of head support or safety cushioning device.

One of the most common physical injuries resulting from motor vehicle accidents is severe neck strain or whiplash. Driver or passenger neck injuries can result when the vehicle collides into an object or is hit from the rear. When a vehicle is struck from behind, the vehicle lunges forward and the occupants, having a lower relative velocity, are pushed forward by the surrounding seat causing their head to swing backwards. Alternatively, when a forward moving vehicle collides with an object, the human occupants are hurled forward as the vehicle rapidly decelerates. As the occupants are thrown forward, their forward motion will be halted by either a seatbelt restraining device or interior components of the vehicle. These devices typically cause the occupant to then be thrown backwards where, again, the occupant's head is flung backwards. In either event, the occupant's seat is the primary surface which cushions the rearward moving energy of the occupant. Many vehicle seats, however, only provide cushioning and support below the neck of the occupant. No support or cushioning is provided for the occupant's head.

Long ago, vehicle manufacturers recognized the problem of whiplash and incorporated headrests into vehicle seats to prevent or minimize head injuries. Many vehicles, however, still do not incorporate headrests as standard equipment. Vehicles typically lacking any headrest device include pickup trucks, commercial and rental moving trucks, school buses, and industrial equipment such as tractors, forklifts, earth moving equipment and trash removal trucks.

Therefore, there is a need for a simple and adaptable headrest assembly which can be simply attached to seats in motor vehicles without any special tools and without altering or modifying the existing structure of the seat. The device should be lightweight and adaptable to any size or shape of seat. The removability of such a device is essential, because many of the drivers or passengers which would use such a device are often in the employ of the vehicle owners. As such, the user may desire to have the option of removing the headrest at the end of each day's work, so that the device can be transferred to and from different vehicles if necessary. Such a device should be inexpensive, durable, well anchored to the vehicle seat and provide a sufficient degree of protection against whiplash or neck injury in the event of a vehicle accident. Herein is described such a device.

SUMMARY OF THE INVENTION

The invention is a removable, lightweight and durable headrest assembly which can be affixed to a wide range of vehicle seats. The device can be made in a wide range of colors and materials. The removable headrest assembly includes a sheet of fabric material connected at its upper end to a flexible housing for receiving a resilient cushion and forming a headrest. The headrest is removably secured to the top of the seatback. The tail of the sheet extends down along the front face of the seat and is inserted through the gap formed between a seatback and seat bottom portion and has means to secure it around a blocking roll which is used to anchor the sheet into position. Different sized blocking rolls are used for front seats and back seats in vehicles as necessary. When an occupant leans back against the sheet, the headrest assembly is further secured into position by the occupants weight. Additionally, the headrest can be formed with a notch to position the assembly on seats having external frames such as school bus seats. In alternative embodiments of the invention, lumbar pads and/or cushioned seatback capes are included in the headrest assembly to enhance comfort and safety.

BRIEF DESCRIPTION OF THE DRAWINGS

FIG. 8 is a perspective view of the front of a vehicle seat having the headrest assembly positioned thereon;

FIG. 9 is a rear perspective view of the vehicle seat illustrated in FIG. 8 showing the headrest assembly positioned thereon and the blocking rolls anchoring the headrest assembly between the seatback and bottom seat;

FIG. 10 is a partial perspective view of an alternative embodiment of the invention showing the headrest having closure flaps to secure and cover the sides of the cushion in the headrest;

FIG. 11 is a perspective view of another alternative embodiment of the invention showing a lumbar cushion secured to the inside surface of the sheet of the headrest assembly;

FIG. 12 is a side view of the device shown in FIG. 11 installed on a vehicle seat indicated with broken lines;

FIG. 13 is a side view of another alternative embodiment of the invention showing the headrest assembly having a cape with a safety cushion affixed thereto to provide cushioning against the seatback when used in vehicles such as school buses and the like;

FIG. 14 is a partial side view of the embodiment shown in FIG. 13 having a notch in the headrest to facilitate positioning on a typical school bus seat having a tubular frame; and FIG. 15 is a partial side view of the invention illustrated in FIG. 1 showing a smaller blocking roll inserted between the seatback and bottom seat of a rear passenger seat of a vehicle.

DESCRIPTION OF THE PREFERRED EMBODIMENTS

Figure 1:
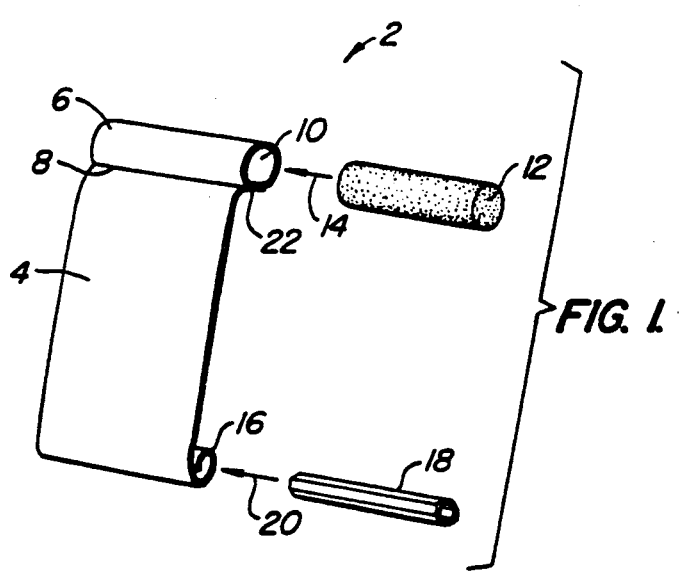
FIG. 1 is a perspective view of the invention showing the component parts of the headrest assembly.
Figure 3:
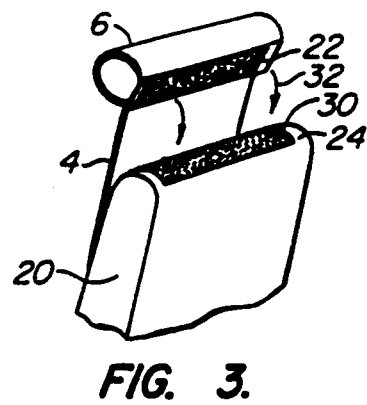
FIG. 3 is a perspective view of the headrest portion of the device shown in FIG. 1 being positioned on the top of a vehicle seatback using securing means along the attachment surface.
Figure 4:
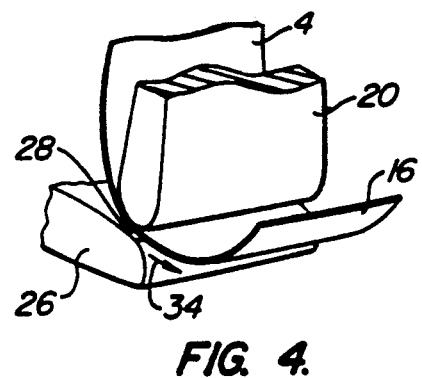
FIG. 4 is a perspective partial view of the device in FIG. 1 showing the tail of the headrest assembly positioned between the seatback and bottom seat of a vehicle.

Referring to FIG. 1, headrest assembly 2 is shown having sheet 4 made of fabric material, headrest 6 and tail 16. The outside surface of headrest 6 may be formed from sheet 4 configured into a tube 10 and stitched using appropriate stitching 8. Alternatively, tube 10 can be fabricated from one piece of flexible material then stitched to sheet 4 or otherwise attached using suitable means.

In the preferred embodiment, sheet 4 is fabricated from a cotton canvas fabric to enhance durability and comfort. When canvas is used, sheet 4 can be washed in a common washing machine when necessary. Alternatively, sheet 4 and tube 10 can be fabricated from plastic, vinyl, polyester or other fabrics, sheepskin or leather in colors to match with the vehicle interior. This list of possible materials is not all inclusive; any other suitable material or combination of materials could be used to practice the invention.

Sheet 4 is stitched at its upper end onto tube 10 which receives cushion 12. Preferably, cushion 12 is made of any suitable resilient open cell or closed cell foam. Alternatively, cushion 12 could employ an air bladder. In the preferred embodiment, the material chosen for fabrication of cushion 12 would take into consideration vehicle safety standards for headrests. Cushion 12 is made removable so that it can be inserted and withdrawn from tube 10 as indicated by arrow 14. Cushion 12 and corresponding tube 10 can be formed and shaped in many possible configurations to suit the particular application. For example, cushion 12 can be cylindrical, rectangular, round, oval, oblong, or contoured. Tube 10 and cushion 12 could be fabricated in a selected unit to permanently secure cushion 12 in tube 10. In the preferred embodiment, cushion 12 and tube 10 are formed to have a relatively flat attached surface 22 and tube 10 is sized to securely retain cushion 12 in position by slightly compressing cushion 12.

Sheet 4 extends down from headrest 6 at stitching 8 to form tail 16. The dimensions of sheet 4 are selected to be suitable for a varying range of vehicle seats. In the preferred embodiment, sheet 4 is approximately 30 inches to 45 inches in length, and has a width of approximately 9 to 15 inches. These dimensions allow the invention to be used in vehicles having bench seats, captains chair seats, or other seat configurations. A blocking roll 18 is included in the headrest assembly 2 to anchor the tail 16 to the vehicle seat as will be further described below. In the preferred embodiment, blocking roll 18 is fabricated from a tubular plastic material such as poly vinyl chloride (PVC) or a suitable alternative. Blocking roll 18 can be made having a cross section of hexagonal, circular, or oval shape. The center of blocking roll 18 is hollow to reduce weight. This feature also allows blocking roll 18 to be used as a container for tools, flashlights or other articles. Suitable end caps or lids can be used to close the ends of blocking roll 18 as desired.

Figure 2:
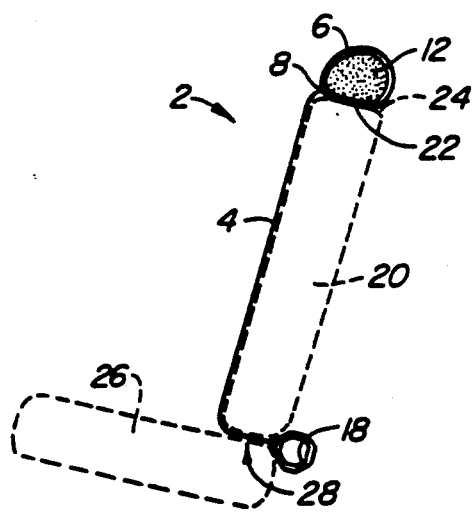
FIG. 2 is a side view showing the device shown in FIG. 1 assembled and positioned on a vehicle seat indicated by broken lines.

Referring now to FIG. 2, the headrest assembly 2 is shown positioned on a vehicle seat, the vehicle seat indicated in broken lines. The vehicle seat is comprised of a seatback 20 and a bottom seat 26. To install headrest assembly 2, cushion 12 is arranged in tube 10 to form headrest 6. Headrest 6 is positioned on the top of seatback 20 and secured using suitable means along attachment surface 22. Sheet 4 extends down along the front face of seatback 20 where it is inserted through gap 28, located between seatback 20 and bottom seat 26, and anchored in place using blocking roll 18. In the preferred embodiment, headrest 6 is secured to the top of the seatback 20 along attachment surface 22 using two layer mating hook-and-catch fabric such as VELCRO ® or similar material. VELCRO ® is a registered trademark of Velcro U.S.A., Inc. A first layer 31 of the hook-and-catch fabric is sewed onto the attachment surface 22 of headrest 6. The corresponding second layer 30 of hook-and-catch material has an adhesive backing which allows it to be affixed to the top surface of the seatback 20. Several pieces of second layer 30 of the hook-and-catch material can be provided to secure to seats in several vehicles to allow one headrest assembly 2 to be interchangeable between vehicles. When the corresponding layers of hook-and-catch fabric are mated together, headrest 6 is removably retained in position on top of seatback 20.

Typical hook-and-catch fabric such as VELCRO ® may not, however, provide adequate retention of headrest 6 by itself in the event of a vehicle collision. Therefore, headrest assembly 2 is formed with tail 16 which is inserted between the seatback 20 and bottom seat 26 where it is anchored into position by blocking roll 18. When installed, sheet 4 lies flush with the outer surface of seatback 20. This feature allows the rearward leaning force of the passenger to aid in securing and anchoring headrest assembly 2 in position. This feature is important, because when a vehicle is hit from behind the impact accelerates the vehicle and the occupant is thrown rearwardly against the seatback. This action pins sheet 4 between the passenger and the seatback 20 and helps to anchor headrest 6 so that it is not displaced when the passenger's head connects with headrest 6 as it is thrown backwards.

Figure 6:
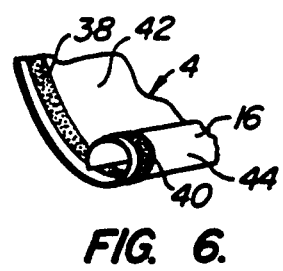
FIG. 6 is a perspective partial view of the tail of the headrest assembly showing a hook and catch securing means used to secure the tail portion around the blocking roll.
Figure 5:
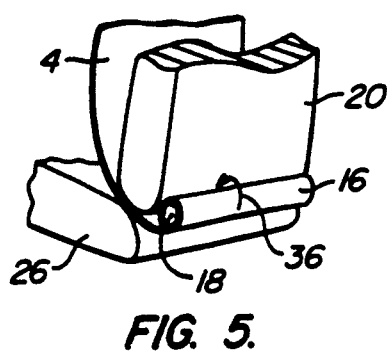
FIG. 5 is a perspective partial view of the device shown in FIG. 4 with the tail of the headrest assembly being rolled about the blocking roll to anchor the headrest assembly on a vehicle seat.
Figure 7:
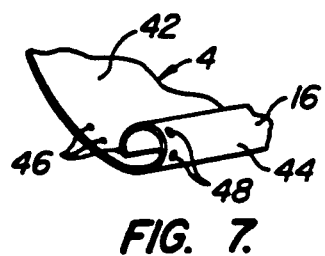
FIG. 7 is a perspective partial view of the tail of the headrest assembly showing an alternative securing means using snaps to secure the tail portion of the headrest assembly around the blocking roll.

The position of headrest assembly 2 on a vehicle seat is further anchored by tail 16 and blocking roll 18. Referring now to FIGS. 4–7, when the headrest assembly 2 is installed tail 16 of sheet 4 is pulled, as indicated by arrow 34, through gap 28 existing between seatback 20 and bottom seat 26. Sheet 4 is pulled taut against seatback 20, and blocking roll 18 is positioned adjacent to tail 16. As shown in FIG. 5, tail can then be rolled onto blocking roll 18 as indicated by arrow 36 and retained in position by suitable securing means. FIGS. 6–7 illustrate two alternative securing means. In the preferred embodiment, hook-and-catch material such as VELCRO ® is used. One layer 38 of the dual layer hook-and-catch fabric is secured to the inside face 42 of sheet 4 and the corresponding second layer 40 of the hook-and-catch fabric is secured to the outside face 44 of sheet 4. When sheet 4 is rolled onto blocking roll 18 until sheet 4 is taut, the two layers 38, 40 of the hook-and-catch fabric mate and thereby secure tail 16 about the blocking roll and maintain tension on sheet 4. Additionally or as a substitute, one layer of the hook-and-catch material, for example layer 38, could be secured to the outer surface of seatback 20 so that the tail 16 secures directly to the seatback 20. One strip or several strips of mating hook-and-catch material 38, 40 can be disposed on sheet 4 and/or on seatback 20 as desired.

Alternatively, the hook-and-catch fabric can be replaced by connecting snaps as shown in FIG. 7. A series of snaps 46 are secured to inside face 42 of sheet 4 or seatback 20 at suitable intervals and corresponding mating snaps 48 are secured to outside face 44 of sheet 4. As sheet 4 is rolled upon blocking roll 18, snaps 46, 48 are snapped together to secure tail 16 into position. Both the hook-and-catch means shown in FIG. 6 and the alternative snaps shown in FIG. 7 work to secure tail about blocking roll 18. As a result, when headrest assembly 2 is properly positioned, headrest 6 is secured to top 24 of seatback 20 and connected to tail 16 which is anchored into position by blocking roll 18. The tension on sheet 4 allows an occupant to slide in and out of the vehicle seat laterally without dislodging headrest assembly 2 while retaining headrest assembly 2 in position during vehicle collision.

FIGS. 8, 9 show headrest assembly 2 properly installed on a typical vehicle seat. Headrest assembly 2 is shown positioned on a seat made for a single occupant, however, the device can as easily be positioned on a bench seat or the like. In an alternative embodiment of the invention shown in FIG. 10, headrest 6 includes enclosure flaps 52, 54 which are folded over the ends of cushion 12 to enhance aesthetic appearance. Closure flaps 52, 54 can be pulled apart to allow cushion 12 to be removed or inserted from tube 10 when the headrest assembly 2 needs to be cleaned or transported.

In another alternative embodiment of the invention, headrest assembly 2 is formed having a detachable lumbar cushion 60 secured to the inside face 42 of sheet 4. In the preferred configuration, hook-and-catch fabric 58, 60 is secured to the inside face 42 of sheet 4 and outside face of lumbar cushion 56. The first layer 58 of hook-and-catch fabric, which is secured to inside face 42, can be made in elongated strips to allow adjustable placement of lumbar cushion 26 as desired for the particular length and height of the vehicle seat. Alternatively, the layers of hook-and-catch fabric 58, 60 can be replaced by snaps or other suitable attachment means. As shown in FIG. 12, when properly positioned lumbar cushion 56 provides comfortable lower back support for the passenger.

In another alternative embodiment of the invention, headrest assembly 2 is provided with a downwardly extending rear cape 62 which includes a safety cushion 64 disposed along its length. This embodiment is intended to be used in passenger vehicles such as school buses and the like where there are a series of vehicle seats each having a metal backing 66 on the rearward facing side of the seatback 20. When such a vehicle is equipped with this embodiment, the safety cushion 64 provides padding to reduce injuries caused when passengers are thrown forward into the back of the next adjacent seat. Because some seats, such as those used in typical schoolbuses, have a steel tubular frame 78 with little surface area on the top of seatback 20, headrest 6 can be formed with a notch 76 as shown in FIG. 14 to add stability. In the embodiments of both FIG. 13 and FIG. 14, the end portion 68 of cape 62 has a securing means suitable for attaching to the tail 16 of sheet 4 as it is wrapped around blocking roll 18. Suitable securing means would include hook-and-catch fabric or snaps, as previously described, which could mate with the hook-and-catch means or snap means already positioned on tail 16. When end portion 68 is secured to tail 16, cape 62 is prevented from swinging or flapping during vehicle motion.

Another alternative embodiment of the invention is shown in FIG. 15. This embodiment is intended to be used on rear vehicle seats positioned adjacent to a rear wall 70 of vehicle compartments. In some vehicles, the rear seat of the vehicle is placed flat against a rear wall 70 and precludes the use of a blocking roll 18 which protrudes out from the seatback 20. In such a vehicle, a smaller diameter blocking roll 72 is used. Tail 16 is first rolled up on smaller blocking roll 72 to adjust the desired length and tension of sheet 4. Smaller blocking roll 72 is then inserted between the seatback 20 and bottom seat 26 where it is held in position by a friction fit between the two seat portions. This installation allows anchoring of the sheet 4 similar to that achieved with the embodiments shown in FIGS. 1-12. In all the embodiments described, the invention provides a simple, lightweight and removable headrest which can enhance vehicle safety and comfort.

The foregoing description of the preferred embodiments of the invention have been presented for purposes of illustration and description. It is not intended to be exhaustive or to limit the invention to the precise form disclosed, and obviously many modifications and variations are possible in light of the above teaching. For example the embodiments having a lumbar cushion can be combined with the cape embodiment, or the notched headrest can be used with or without a cape. The embodiments chosen and described in this description were selected to best explain the principles of the invention in its practical application to thereby enable others skilled in the art to best utilize the invention in various embodiments and with various modifications as are suited for the particular use and installation contemplated. Various modifications, alterations or substitutions can be made to the preferred embodiments without departing from the scope of the invention as defined by the claims appended hereto.

What is claimed is:

1. A removable headrest assembly for installation on a vehicle seat having a seatback and a bottom seat, the seatback having a forward side, a rearward side, an upper surface and a lower surface, the removable headrest assembly comprising:

a cushioned headrest, the cushioned headrest having a resilient energy-absorbing pad arranged in a flexible housing, the housing including means for removably affixing the housing to the upper surface of the seatback, the affixing means including a first portion secured to the housing and a second portion secured to the upper surface of the seatback, the first portion and the second portion configured to removably mate together to securely connect the cushioned headrest to the upper surface of the seatback and restrict movement in all directions;

a sheet portion having a first end, a second end, a front side and a back side, said first end attached to said cushioned headrest and said second end having a width and including a securing means, the securing means including a first part which removably mates with a corresponding second part, the first part being disposed on said front side of the sheet portion and the second part being disposed on the back side of the sheet portion to thereby allow the second end of the sheet portion to be rolled upon itself in either direction adjustably between a first position and a second position and secure the front side to the back side by mating the first part and second part together; and an anchoring means for anchoring the second end of said sheet portion adjacent said seatback and said bottom seat, the anchoring means including a tubular member configured to lie adjacent the second end of the sheet portion, whereby when the second end is inserted between the lower surface of the seatback and the bottom seat, the front side and the back side of the sheet portion can be rolled around the tubular member and mated together between the first position and the second position to thereby adjustably tension the sheet and restrict movement of the second end of the sheet portion.

2. The headrest assembly recited in claim 1, wherein said pad comprises a resilient foam structure.

3. The headrest assembly recited in claim 1, wherein the pad comprises an air bladder structure.

4. The headrest assembly as recited in claim 1, wherein the tubular member is formed substantially of plastic material having a length generally corresponding to the width of the second end of the sheet portion.

5. The headrest assembly recited in claim 4, wherein said securing means comprises a two-part hook-and-catch fabric material.

6. The headrest assembly recited in claim 4 further comprising a cape secured to said cushioned headrest and comprising a safety cushion attached thereto, the safety cushion configured to provide an energy-absorbing surface across the rearward side of the seatback, the cape further comprising means for securing the cape to the second end of the sheet portion.

7. The headrest assembly recited in claim 1 further comprising a lumbar cushion removably attached to said sheet between said first end and said second end.

8. The headrest assembly recited in claim 1 further comprising a lumbar pad disposed upon the sheet portion, and a cape secured to said cushioned headrest, said cape having a safety cushion disposed thereon, wherein when said headrest assembly is positioned on a vehicle seat, the sheet downwardly depends from said cushioned headrest adjacent a front surface of said seatback and said cape downwardly depends from said cushioned headrest adjacent a rear surface of said seatback.

9. A removable headrest assembly for installation on a vehicle seat having a seatback and a bottom seat, the seatback having a forward side, a rearward side, an upper surface and a lower surface, the removable headrest assembly comprising:

- a cushioned headrest formed of a resilient energy absorbing contoured pad removably arranged in a flexible housing, said housing having means for removable attachment to the upper surface of the seatback and configured to encapsulate the pad;
- a sheet portion having a first end, a second end, a front side and a back side, said first end attached to said housing and said second end including a two-part hook-and-catch material having a first part which corresponds to a mating second part, the first part being disposed on the front side of the sheet portion and having a length, the second part being disposed on the back side of the sheet portion and having a corresponding length; and
- a plastic tubular member configured to lie adjacent the second end of the sheet portion, wherein said second end of said sheet can be secured around said tubular structure and rolled up upon itself to mate the first part to the second part along a length of the sheet portion to adjustably tension the sheet portion and retain the second end against the lower side of the seatback and the seat bottom.

10. a removable headrest assembly for installation on a vehicle seat having a seatback and a bottom seat, the seatback having a forward side, a rearward side, an upper surface and a lower surface, the removable headrest assembly comprising:

- a cushioned headrest formed of a resilient energy-absorbing contoured pad removably arranged in a flexible housing, said housing having means for removable attachment to the upper surface of the seat back and configured to encapsulate the pad;
- a sheet portion having a first end, a second end, a front side and a back side, said first end attached to said housing and said second end including a snap closure device having a first part which corresponds to a mating second part, wherein said first part is disposed on the front side of said sheet, and the second part is disposed on said back side of said sheet; and
- a plastic tubular member configured to lie adjacent the second end of the sheet portion, wherein said second end of said sheet can be secured around said tubular structure and rolled up upon itself to mate the first part to the second part along a length of the sheet portion to adjustably tension the sheet portion and retain the second end against the lower side of the seat back and the seat bottom.

11. The headrest assembly recited in claim 9, further comprising a lumbar cushion removably attached to said portion between said first end and said second end.

12. The headrest assembly recited in claim 9 further comprising a cape secured to said cushioned headrest wherein said cape comprises a safety cushion attached thereto, wherein when said headrest assembly is positioned upon a vehicle seat, said sheet downwardly depends from said cushioned headrest adjacent a front surface of the seatback and said cape downwardly depends from said cushioned headrest adjacent a back surface of said seatback.

* * * * *